US008101222B2

(12) United States Patent
Burroughs et al.

(10) Patent No.: US 8,101,222 B2
(45) Date of Patent: Jan. 24, 2012

(54) BEVERAGE GLASS WITH INTERNAL DECANTING, FILTERING, MIXING AND AERATING CELL

(75) Inventors: James R Burroughs, Beverly Hills, CA (US); Dillon Burroughs, Beverly Hills, CA (US); Ken Benson, Southbury, CT (US); Ed Gilchrest, Oxford, CT (US)

(73) Assignee: Chevalier Collection, Ltd., Beverly Hills, CA (US)

( * ) Notice: Subject to any disclaimer, the term of this patent is extended or adjusted under 35 U.S.C. 154(b) by 150 days.

(21) Appl. No.: 12/464,992

(22) Filed: May 13, 2009

(65) Prior Publication Data

US 2010/0124594 A1 May 20, 2010

Related U.S. Application Data

(63) Continuation-in-part of application No. 12/272,889, filed on Nov. 18, 2008.

(51) Int. Cl.

| | |
|---|---|
| ***A23C 3/037*** | (2006.01) |
| ***C12G 3/06*** | (2006.01) |
| ***A47J 31/04*** | (2006.01) |
| ***A47J 31/20*** | (2006.01) |
| ***A47G 19/14*** | (2006.01) |
| ***B65D 77/00*** | (2006.01) |

(52) U.S. Cl. .............. 426/474; 99/306; 99/313; 99/317; 99/319; 99/277.1; 206/217; 261/74; 220/636; 220/703

(58) Field of Classification Search .................. 426/474; 99/306, 310, 319, 322, 313, 317, 277.1; 206/217; 261/74; 220/636, 703
See application file for complete search history.

(56) References Cited

U.S. PATENT DOCUMENTS 1,405,662 A * 2/1922 Biette .............................. 99/306
1,431,490 A * 10/1922 Rowley ............................ 99/310
2,187,558 A 1/1940 Kushima
3,379,338 A 4/1968 Marks et al.
4,555,040 A 11/1985 Butenschon
(Continued)

FOREIGN PATENT DOCUMENTS

CN 101285029 A 10/2008
(Continued)

OTHER PUBLICATIONS

Benton et al. WO 2007/096676. Aug. 30, 2007.*
(Continued)

*Primary Examiner* — D. Lawrence Tarazano
*Assistant Examiner* — J. Kravets
(74) *Attorney, Agent, or Firm* — DeLio & Peterson, LLC; Peter W. Peterson

(57) ABSTRACT

A drinking container for decanting, filtering, mixing and/or aerating a beverage. The drinking container comprises a bowl having an upper opening and an aerating cell having a wall, an upper opening along the top of the cell and a plurality of openings or perforations through the wall. The cup-shaped cell has an upwardly facing hollow or concave configuration, optionally with a central upwardly extending protrusion, and is attached to and within the bowl, to decant, filter, mix and/or aerate a beverage that is poured through the bowl upper opening and into the cell upper opening, and subsequently flows through the at least one perforation into the bowl. Preferably, the drinking container is a wine glass having a base and stem supporting the bowl and the beverage is wine.

13 Claims, 14 Drawing Sheets

U.S. PATENT DOCUMENTS

| | | | | |
|---|---|---|---|---|
| 4,993,566 | A | 2/1991 | Eberle | |
| 5,713,263 | A | 2/1998 | Burks | |
| 6,409,374 | B1 | 6/2002 | Willat | |
| 6,508,163 | B1 | 1/2003 | Weatherill | |
| 6,568,660 | B1 | 5/2003 | Flanbaum | |
| 6,644,846 | B2 | 11/2003 | Willat | |
| 7,543,717 | B2 | 6/2009 | Hinkle | |
| 2006/0032855 | A1 | 2/2006 | Hinkle | |
| 2007/0125720 | A1 | 6/2007 | Stecca | |
| 2007/0256568 | A1 | 11/2007 | Nudi et al. | |
| 2007/0267422 | A1 | 11/2007 | Barducci | |
| 2008/0290101 | A1 | 11/2008 | Stecca | |
| 2008/0290102 | A1 | 11/2008 | Mangano | |
| 2010/0025867 | A1 * | 2/2010 | Benton et al. | 261/110 |

FOREIGN PATENT DOCUMENTS

| | | | |
|---|---|---|---|
| CN | 101285029 A | * | 10/2008 |
| DE | 29817268 | | 4/1999 |
| DE | 202006003849 | | 6/2006 |
| EP | 1053708 | | 11/2000 |
| EP | 1210890 | | 6/2002 |
| EP | 1795091 | | 6/2007 |
| FR | 1435764 | | 3/1964 |
| FR | 2788210 | | 7/2000 |
| FR | 2822806 | | 10/2002 |
| FR | 2867047 | | 9/2005 |
| WO | 2005120306 | | 12/2005 |
| WO | 2007105075 | | 3/2007 |
| WO | WO2007096676 | | 8/2007 |

OTHER PUBLICATIONS

Shaw. “Cranberry Percolator Glogg.” Nov. 7, 1994.*

Junkyard Clubhouse. “If the Peppermill Served Punch, It Would Come in This.” Oct. 17, 2007.*

* cited by examiner

FIG. 10
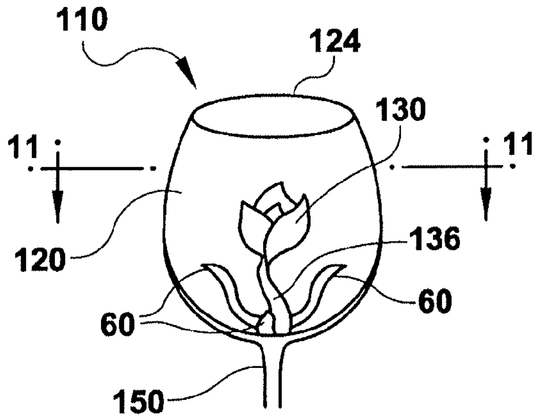
FIG. 11
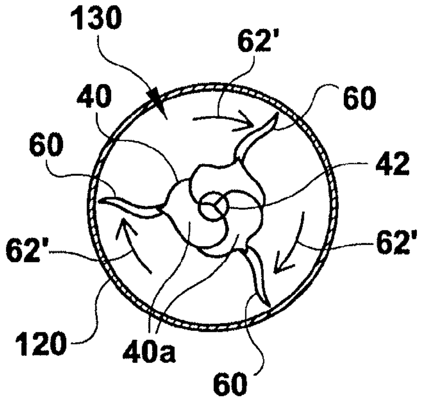
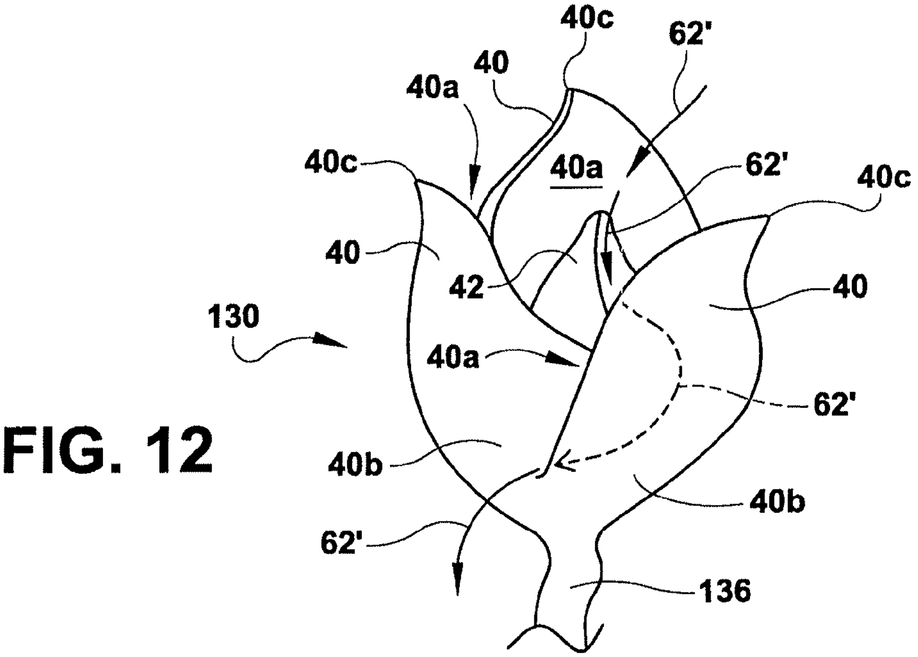
FIG. 12

BEVERAGE GLASS WITH INTERNAL DECANTING, FILTERING, MIXING AND AERATING CELL

BACKGROUND OF THE INVENTION

1. Field of the Invention

The present invention relates to individual serving-sized beverage containers, particularly, wine and martini glasses, containing an internal cell for decanting, filtering, mixing and/or aerating a liquid beverage as it is poured into the glass.

2. Description of Related Art

A wine glass is generally composed of three parts: the bowl, stem, and foot. Glasses for red wine are characterized by a rounder, wider bowl with a larger opening, which permits the wine to breathe. The shape of the bowl concentrates the flavor and aroma to emphasize particular characteristics of the wine.

Beverages made from fruit often contain small solid particles from the skin or seeds of the fruit which may settle to the bottom of the beverage container. Wine, in particular, often contains these particles which may be transferred with the wine to the wine glass.

Wine glasses have been made with internal structures to enhance the swirling and mixing of the wine with air after it has been poured into the glass, for example, as shown in U.S. Patent Publication No. US2006/0032855. Other devices for decanting wine as it is poured are disclosed in U.S. Pat. No. 6,409,374, U.S. Patent Publication Nos. US2007/0256568 and US2008/0290102, and WO2007/105075. None of these devices provide an effective structure within the wine glass itself to permit the decanting, filtering, mixing and aerating of the wine as it is poured.

SUMMARY OF THE INVENTION

Bearing in mind the problems and deficiencies of the prior art, it is therefore an object of the present invention to provide a beverage glass for aerating a beverage upon pouring the beverage into the beverage glass.

It is another object of the present invention to provide a beverage glass having internal means for decanting, filtering, mixing and/or aerating a beverage upon pouring the beverage into the beverage glass.

A further object of the invention is to provide a beverage glass for changing or maintaining the temperature of a beverage.

It is yet another object of the present invention to provide a beverage glass having an interior cell for holding and mixing a flavored liquid with a beverage.

Still other objects and advantages of the invention will in part be obvious and will in part be apparent from the specification.

The above and other objects, which will be apparent to those skilled in the art, are achieved in the present invention which is directed to a drinking container for decanting, filtering, mixing and/or aerating a beverage. The drinking container comprises a bowl having a bottom and an upper opening; and an aerating cell within the bowl having an upwardly facing hollow, concave portion above the bottom of the bowl located a distance above a bottom of the bowl sufficient to permit a desired volume of the beverage to flow therethrough and fall by gravity into the bottom of the bowl. The cell is adapted to decant and/or aerate a beverage that is poured through the bowl upper opening and onto the cell and subsequently flowed through the hollow portion and falls by gravity into the bottom of the bowl.

In a related aspect, the invention is directed to a method of using a drinking container for decanting, and/or aerating a beverage comprising providing a drinking container having a bowl with a bottom and an upper opening and an aerating cell within the bowl having an upwardly facing hollow portion above the bottom of the bowl, providing a beverage, and pouring the beverage through the bowl upper opening into the aerating cell. The beverage is then permitted to flow through the upwardly facing hollow portion and fall by gravity into the bottom of the bowl, thereby decant and/or aerate the beverage.

Preferably, the cell is supported on at least one leg extending above a bottom of the bowl, and the hollow portion has a plurality of openings around the periphery of the cell. The method then includes flowing the beverage through the openings into the bottom of the bowl.

The drinking container may include an upwardly extending protrusion adjacent the upwardly facing hollow portion, along with a plurality of upwardly facing hollow portions disposed around the protrusion and above the bottom of the bowl. The method then includes pouring the beverage onto the upwardly extending central protrusion and permitting it to flow into the adjacent upwardly facing hollow portion, or pouring the beverage onto the plurality of upwardly facing hollow portions.

The drinking container may further include outwardly extending projections inside the bowl at the bottom adapted to impart agitation to the beverage as it is swirled around the bottom of the bowl. The method then includes imparting agitation to the beverage by swirling the beverage around the bottom of the bowl over the outwardly extending projections.

The present invention is also directed to a drinking container for decanting and/or aerating a beverage comprising a bowl having an upper opening, and an aerating cell having a wall, an upper opening along the top of the cell and at least one perforation through the wall. The cell is within the bowl and supported above a bottom thereof by a plurality of legs extending outward of a center of the bowl. The at least one cell perforation is located a distance above a bottom of the bowl sufficient to permit a desired volume of the beverage to flow therethrough and fall by gravity into the bottom of the bowl. The cell is adapted to decant and/or aerate a beverage that is poured through the bowl upper opening and into the cell upper opening and subsequently flowed through the at least one perforation into the bowl. The legs are adapted to impart agitation to the beverage as it is swirled around the bottom of the bowl.

The invention is also directed to a drinking container that comprises a bowl having an upper opening and an aerating cell above the bottom of the bowl having a wall, an upper opening along the top of the cell and at least one opening or perforation through the wall. The cell preferably has an upwardly facing hollow or concave configuration located a distance above the bottom of the bowl sufficient to permit a desired volume of the beverage to flow therethrough and fall by gravity into the bottom of the bowl. The cell is attached to and within the bowl, to decant, filter, mix and/or aerate a beverage that is poured through the bowl upper opening and into the cell upper opening, and subsequently flows through the at least one opening or perforation into the bowl.

In another aspect, the present invention is directed to a method of using a drinking container for decanting, filtering, mixing and/or aerating a beverage. The method includes providing a drinking container having a bowl with an upper opening and, within the bowl, an aerating cell having a wall, an upper opening along the top of the cell and at least one perforation through the wall. The method includes providing a beverage, pouring the beverage through the bowl upper opening into the cell upper opening and permitting the beverage to flow through the at least one perforation and into the bowl, thereby decanting, filtering, mixing and/or aerating the beverage.

Preferably, the cell has a plurality of cell perforations in at least a portion of the cell wall and, more preferably, the cell perforations are all located a distance above a bottom of the bowl a distance sufficient to permit a desired volume of the beverage to flow therethrough and into the bowl. The method includes, in the step of permitting the beverage to flow through the at least one perforation and into the bowl, terminating the pouring upon the beverage level reaching about the level of the cell perforations. Alternately, the cell perforations extend to a bottom of the bowl.

The method may include providing a plurality of perforations in only a portion of the cell wall and the cell may include a lower end supported above a bottom of the bowl a distance designating a desired volume of the beverage to be held in the bowl. The cell may be supported above a bottom of the bowl.

The cell may be removably attached to the bowl. The cell may be removed after permitting the beverage to flow through the at least one perforation and into the bowl. Alternately, the cell may have a lip supported by a rim along the bowl upper opening wherein the cell lip is placed in contact with the bowl rim prior to pouring the beverage through the bowl upper opening into the cell upper opening.

The drinking container may include a cell having an upper opening with a width less than half that of the bowl upper opening. Alternately, the cell upper opening may have a width greater than half that of the bowl upper opening.

The drinking container may include a cell having a separate, removable filter basket and the filter basket may be removed after permitting the beverage to flow through the at least one perforation and into the bowl. The drinking container preferably has the bowl opening larger than the user's mouth.

Preferably, the drinking container is a wine glass having a base and stem supporting the bowl and the beverage is a wine such as a red wine.

Alternately, the cell perforations extend to a bottom of the bowl. A first beverage may be poured into the cell and a second beverage may then be poured into the bowl, and mixing of the first and second beverages may then be initiated by flow of the first beverage through the perforations and into the bowl. The pouring may be terminated upon the beverage level reaching about the level of the cell lower end, or at a higher height.

In another aspect, the present invention is directed to a drinking container for changing or maintaining beverage temperature. The drinking container comprises a bowl having an upper opening and a sealed cell within the bowl containing a substance for cooling or heating the beverage in the glass without diluting the beverage. The cell has an upper end marking a desired volume of beverage within the bowl.

Preferably, the substance in the sealed cell has a solid-to-liquid phase change between about 40 and 65° F. (4 and 18° C.). The bottom of the bowl may have an upwardly convex or upwardly concave surface and the sealed cell is below the convex or concave surface. The sealed cell may be removable from the bowl. Preferably, the drinking container is a wine glass having a base and stem supporting the bowl and the beverage is a wine such as a white wine.

In yet another aspect, the present invention is directed to a drinking container for mixing a beverage, and a method for using same. The container comprises a bowl having an upper opening and a mixing cell attached to and within the bowl having a wall, an upper opening along the top of the cell and plurality of openings through the wall. The axes of the openings are non-radially oriented with respect to a center of the cell. The cell is adapted to mix and swirl a beverage that is poured through the bowl upper opening and into the cell upper opening and subsequently flowed through the perforations into the bowl.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 10 is a perspective view of a fifth embodiment of the beverage glass according to the present invention.

FIG. 11 is a sectional top plan view of the beverage glass of FIG. 9 shown along lines 11-11.

FIG. 12 is a close-up perspective view of the aeration cell of the beverage glass of FIG. 10.

DESCRIPTION OF THE PREFERRED EMBODIMENT(S)

In describing the preferred embodiment of the present invention, reference will be made herein to FIGS. 1-21 of the drawings in which like numerals refer to like features of the invention.

Figure 1:
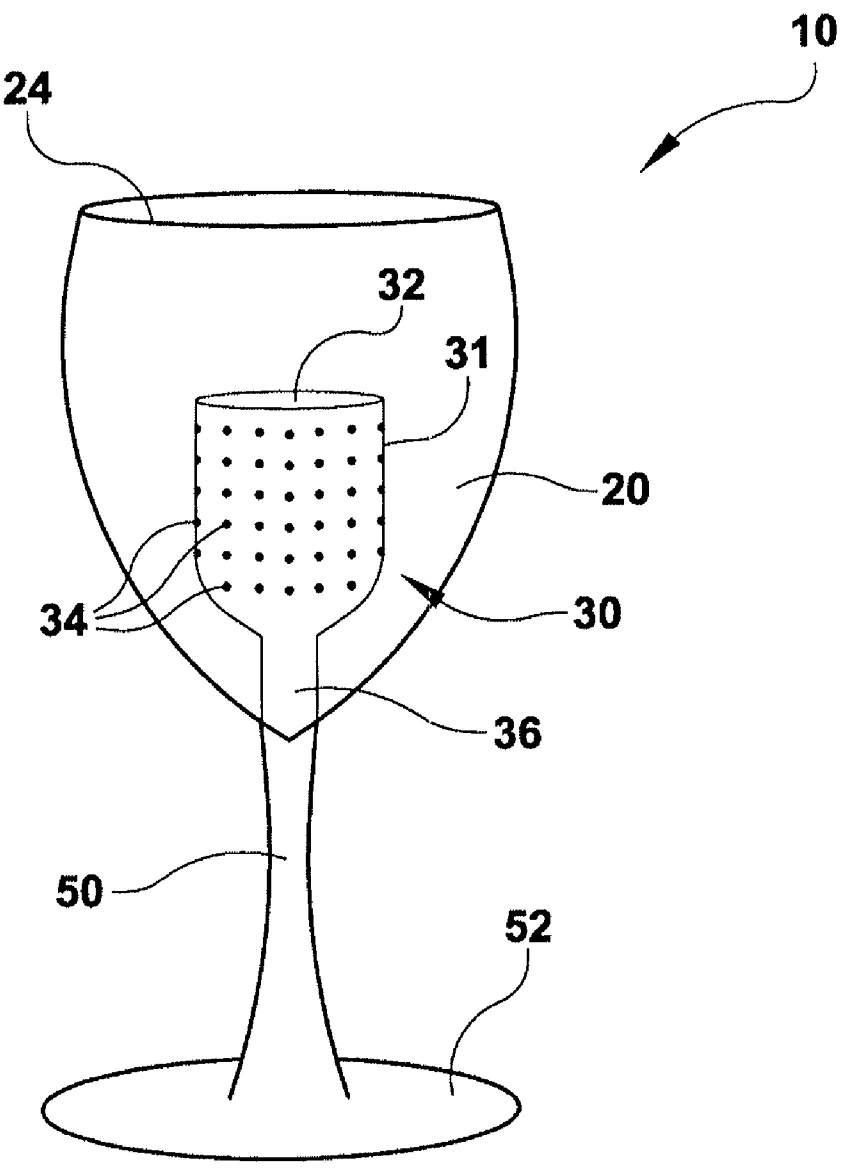
FIG. 1 is a perspective view of a beverage glass according to the present invention.

As shown in FIG. 1, a beverage drinking container or glass 10 includes a bowl 20 having a wide opening 24 at the top, preferably a glass bowl similar to that of an ordinary wine glass, an elongated lower stem 50 and a foot or base 52 for supporting the beverage glass on a flat horizontal surface. The beverage glass includes within the bowl a smaller internal cell or compartment 30 of cylindrical configuration having a side surface or wall 31, an upper opening 32 and at least one, and preferably multiple, perforations 34 distributed evenly on and extending through the side wall(s) thereof. Cup-shaped cell 30 has an upwardly facing hollow or concave configuration to receive the beverage as it is poured into bowl 20. The perforated internal cell provides decanting, filtering, mixing and/or aerating of a beverage upon pouring the beverage into the bowl beverage glass through the opening of the bowl. The internal cell or pod 30 is supported within the interior of bowl 20 by a stem, leg or other support structure 36 such that the top of the cell is no higher than the top opening 24 of the bowl, and the bottom of the cell is above the bottom of the bowl. Support 36 is of sufficient height to permit a desired volume of the beverage to flow through cell 30 and fall by gravity into the bottom of the bowl.

Figure 2:
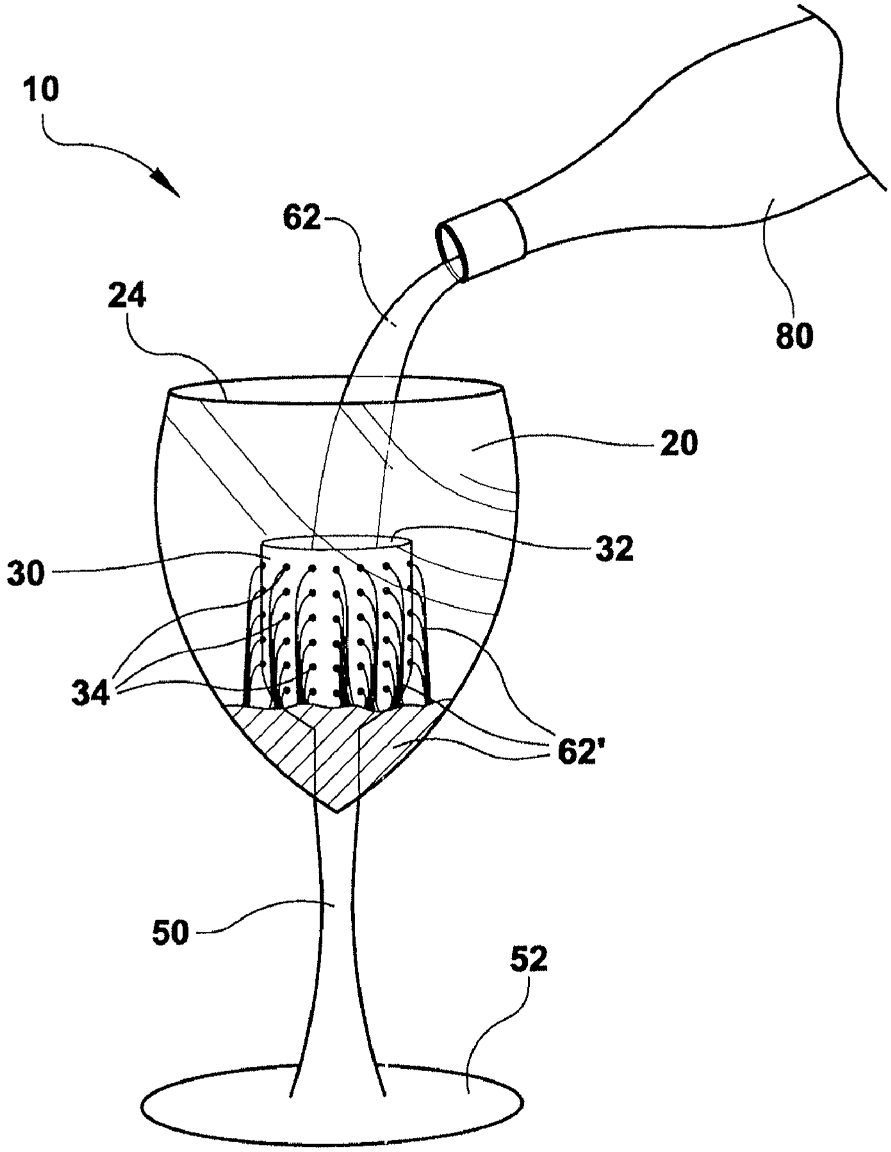
FIG. 2 is a perspective view of a beverage glass showing the flow of the beverage through an integrated internal cell according to the present invention.

A method of using the beverage glass 10 for decanting, filtering, mixing and/or aerating of a beverage is shown in FIG. 2. The wine 62 is poured from a wine bottle 80 through bowl opening 24 into the upper opening 32 of cell 30. As the cell fills with the wine, gravity forces the wine to flow through the plurality of perforations 34 and fall by gravity into the bowl 20, filtering any particle present in the wine which drops below the perforations or is too large to pass through the perforations. As wine stream 62' exits the perforations, the surface area of the wine exposed to the atmosphere is increased and allows for more efficient aeration of the wine than would be provided by pouring the wine directly into the wine glass bowl.

Preferably, the method includes providing the beverage glass having a bowl, an aerating cell having an exterior surface, an upper opening along the top of the surface and a plurality of perforations on the surface integrated within the bowl of the beverage glass. The method includes pouring the beverage into the upper opening 32 of the aerating cell 30 and allowing the beverage to permeate through the perforations of the exterior surface 31. The method decants, mixes, aerates and/or filters the beverage 62 flowing through the cell 30 and into the glass bowl 20 outside of and below the cell.

Figure 3:
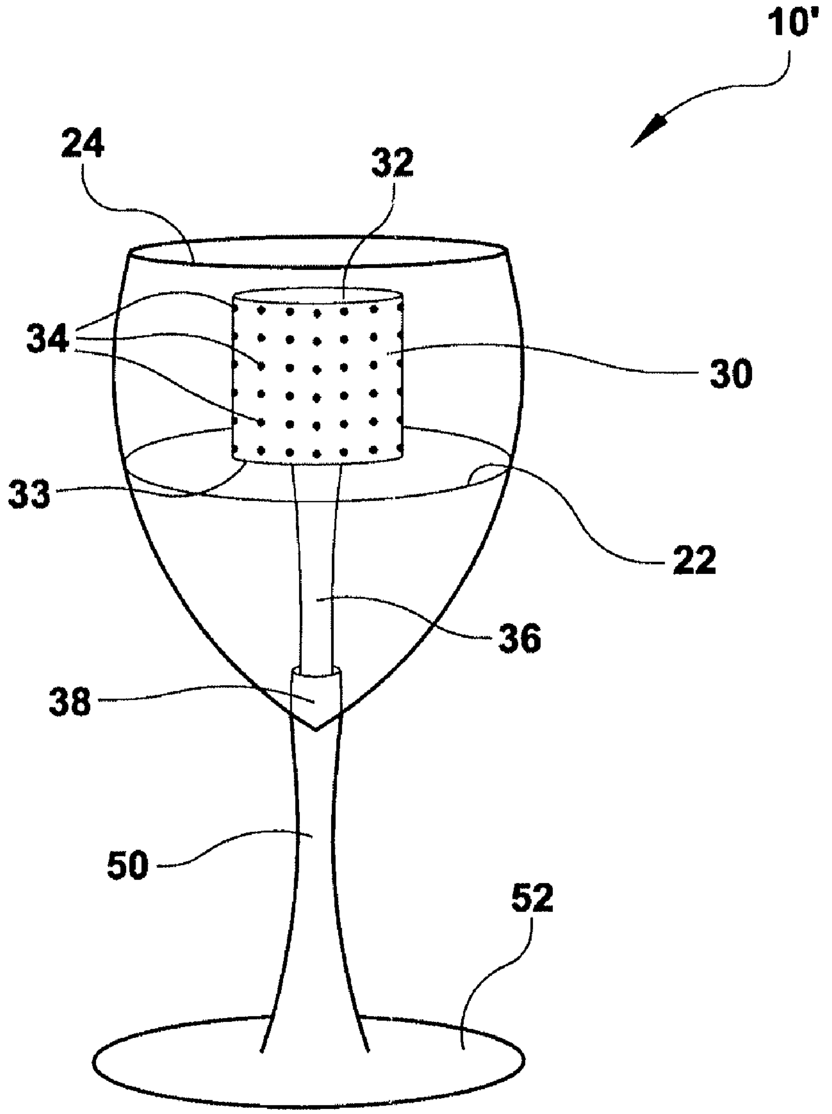
FIG. 3 is a perspective view of a beverage glass having a removable perforated cell and volume indicator.

FIG. 3 shows additional features of the self-decanting beverage glass 10' which includes a removable aerating portion 30 that is attached and connected to the support structure 36. The support structure 36 may be removably or permanently integrally attached to the lower surface of bowl 20 or to a top end of stem 50. Preferably the support structure 36 fits slidingly in a support socket 38 whereby cell 30 may be easily inserted or removed from the socket. Volume indication line 22, which is etched in or otherwise applied to the bowl to indicate a standard portion or pour of wine or beverage, is at the same level and coincides with the lower end 33 of cell 30. A specific volume value may additionally be indicated along line 22.

Figure 4:
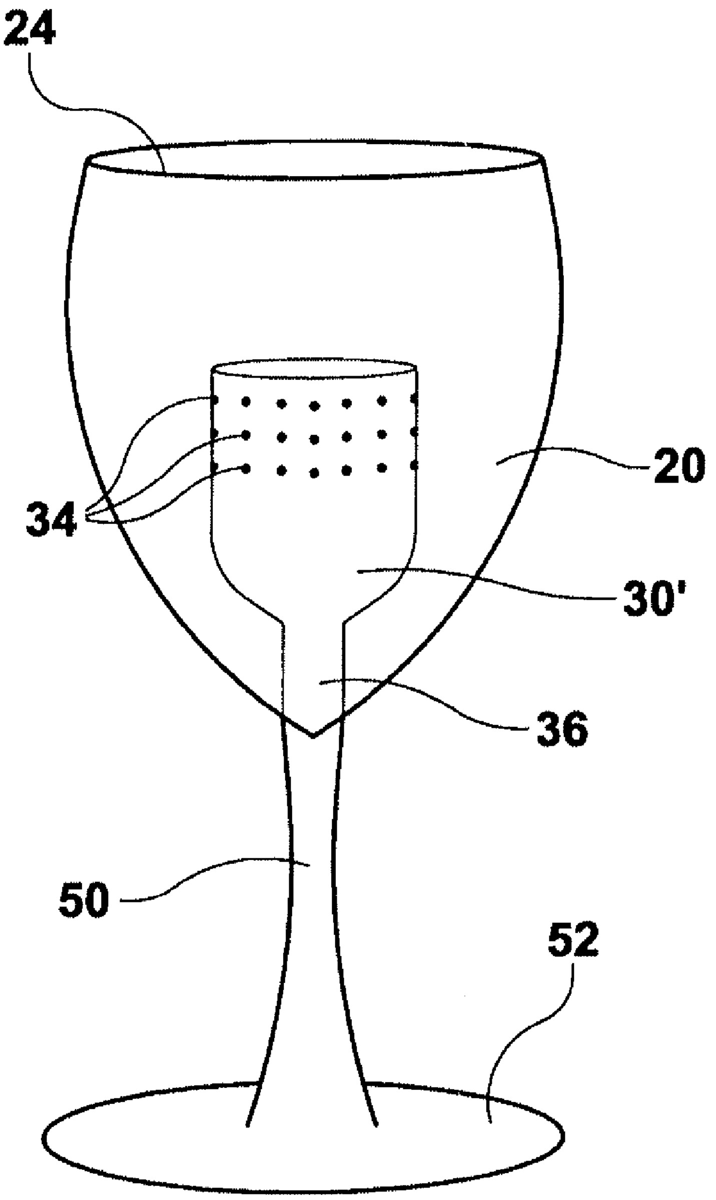
FIG. 4 is a perspective view of a second embodiment of the beverage glass according to the present invention.

In FIG. 3, the perforations 34 extend vertically all along the side of cell 30 between the bottom 33 and top 32. FIG. 4 shows another embodiment of the beverage glass wherein the perforations 34 are disposed only on the upper half of cell 30', with the lower half of the cell being solid and free of perforations. In this embodiment, cell 30' provides a decanting feature to prevent sediment from flowing from cell 30' to glass bowl 20. The embodiment shown in FIG. 5 includes perforations 34 disposed only on the lower 20% of the cell 30", with the upper 80% of the cell side walls being solid and free of perforations. The internal cell may be made with any desired vertical portion of the side walls having perforations therein, with the remainder of the side walls being solid. The perforations may be located in the bottom wall of the cell, in addition to or as an alternative to perforations in the side walls. In the embodiment where the glass is used for aeration and/or filtration of the beverage, the lowermost perforations should be above the bottom of the bowl a sufficient distance for the desired volume of the aerated or filtered beverage to be contained within the bowl.

Figure 5:
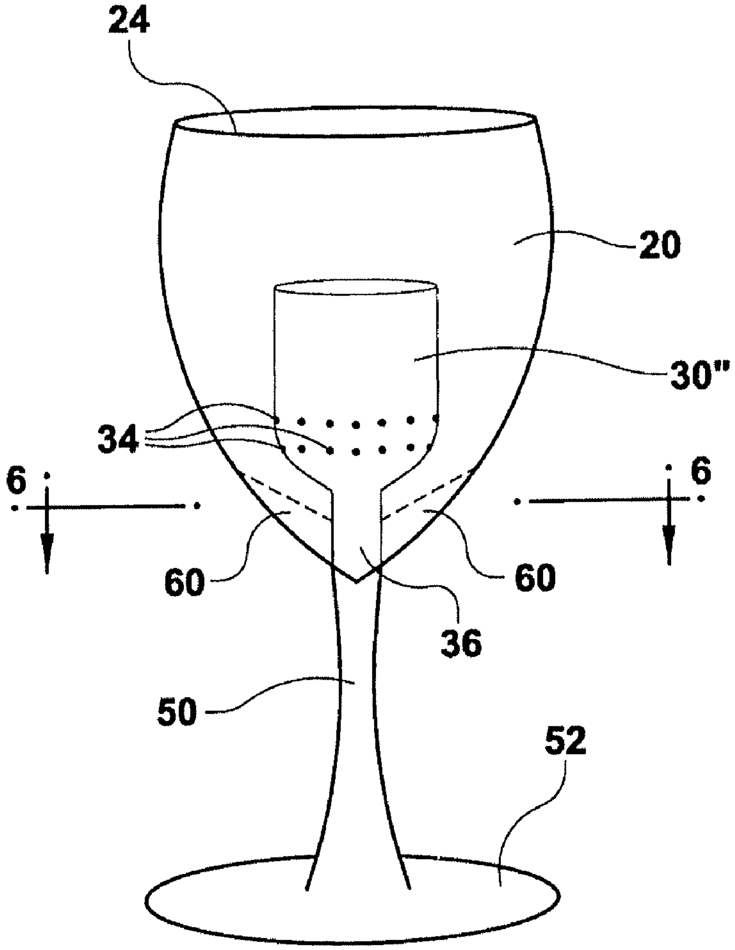
FIG. 5 is a perspective view of a third embodiment of the beverage glass according to the present invention.
Figure 6:
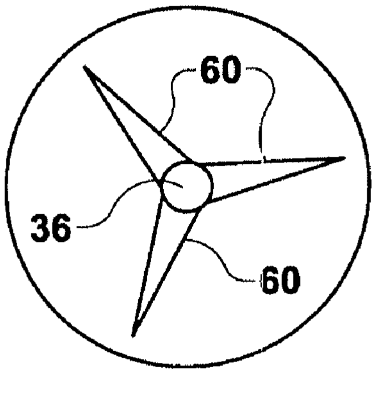
FIG. 6 is a sectional top plan view of the beverage glass of FIG. 5 shown along lines 6-6.

To further enhance the aeration of the beverage, particularly wine, outwardly extending projections or ridges may be located inside the bowl at the bottom to impart agitation to the beverage as it is swirled around the bottom of the bowl. Such projections or ridges 60 may be formed into and/or extend upwardly from the bottom of the bowl, as shown in FIGS. 5 and 6.

Figure 7:
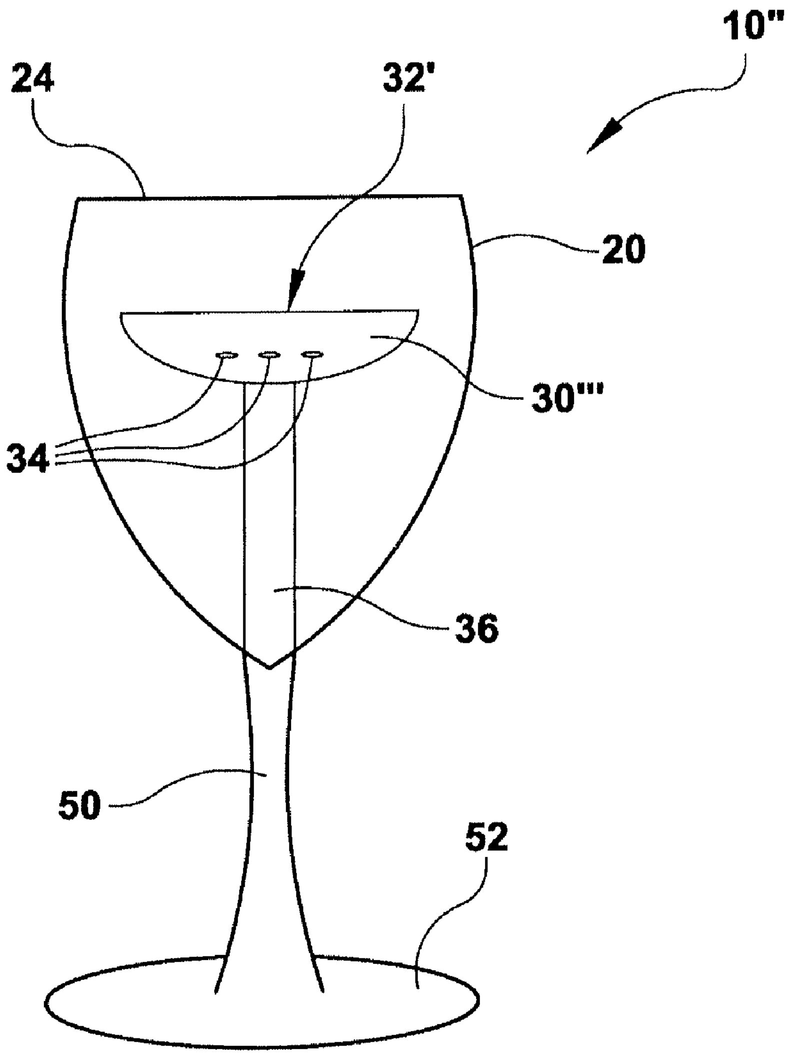
FIG. 7 is a side elevational view of a fourth embodiment of the beverage glass according to the present invention.

FIG. 7 shows an alternate embodiment of the aerating cell 30''' which may be shallower and wider than those of FIGS. 1-5. The aerating portion 30''' is attached and connected to the top of the support structure 36, includes perforations 34 in the lower wall of the cell, and provides a larger upper opening 32' so the wine poured from the bottle is less likely to bypass the aeration cell. In this embodiment, the width or diameter of cell 30''' is greater than half of the width or diameter of the opening 24 of the bowl 20.

Figure 8:
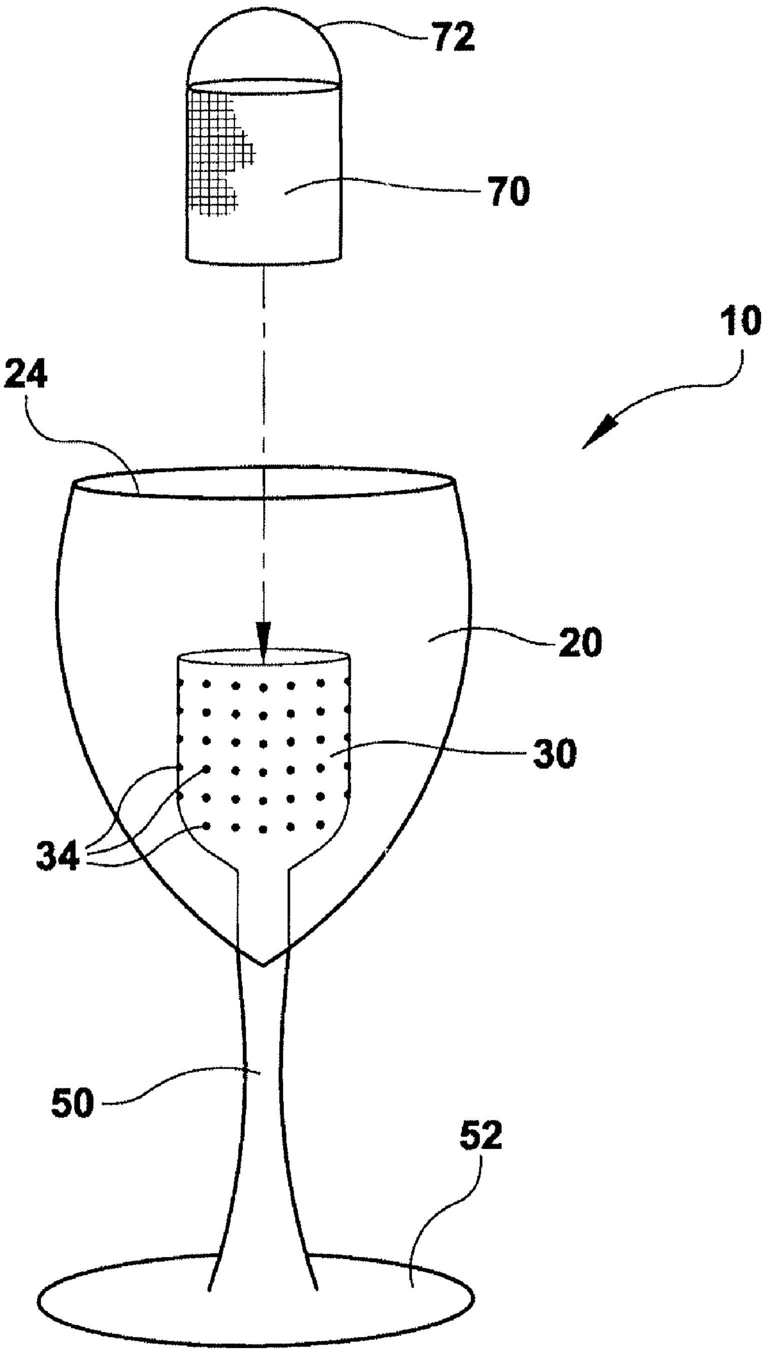
FIG. 8 is a perspective view of a beverage glass having a removable screen filter in the internal cell.

In another embodiment of the beverage glass shown in FIG. 8, the aerating cell 30 includes a separate, removable filter basket 70 for improved filtering of the beverage. In addition, the filter basket includes a handle 72 which allows easier insertion and removal into and from the aerating cell 30. This also allows for easier disposal of any particles or sediment filtered from the wine.

Figure 9B:
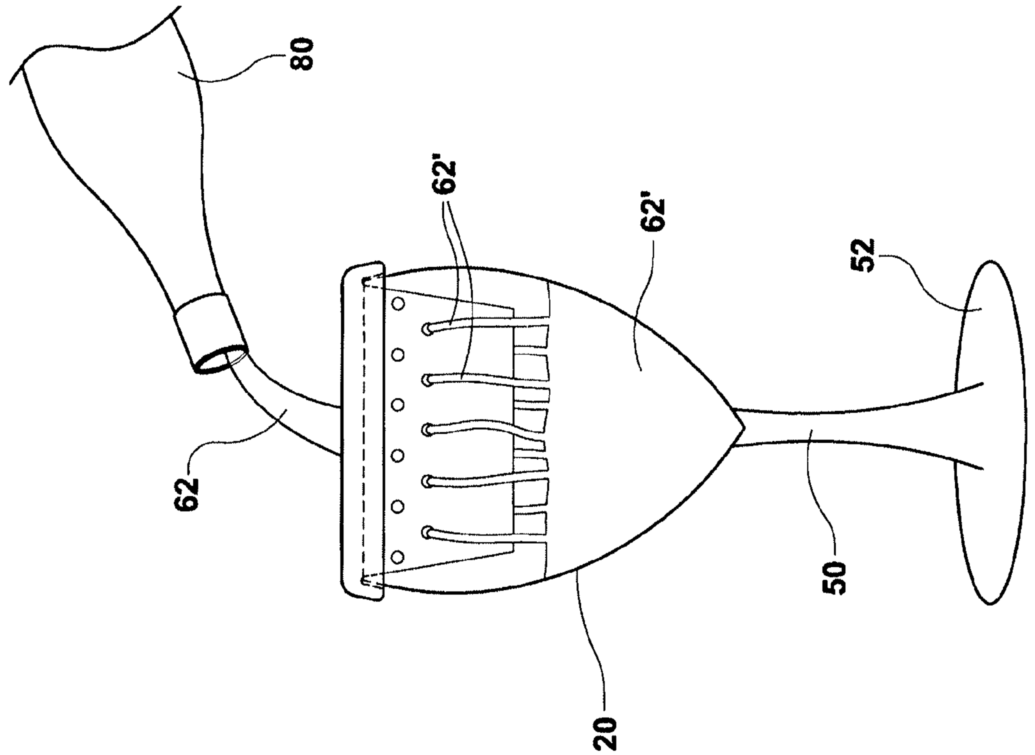
FIG. 9B is a collapsed view of the beverage glass shown in FIG. 8A.
Figure 9A:
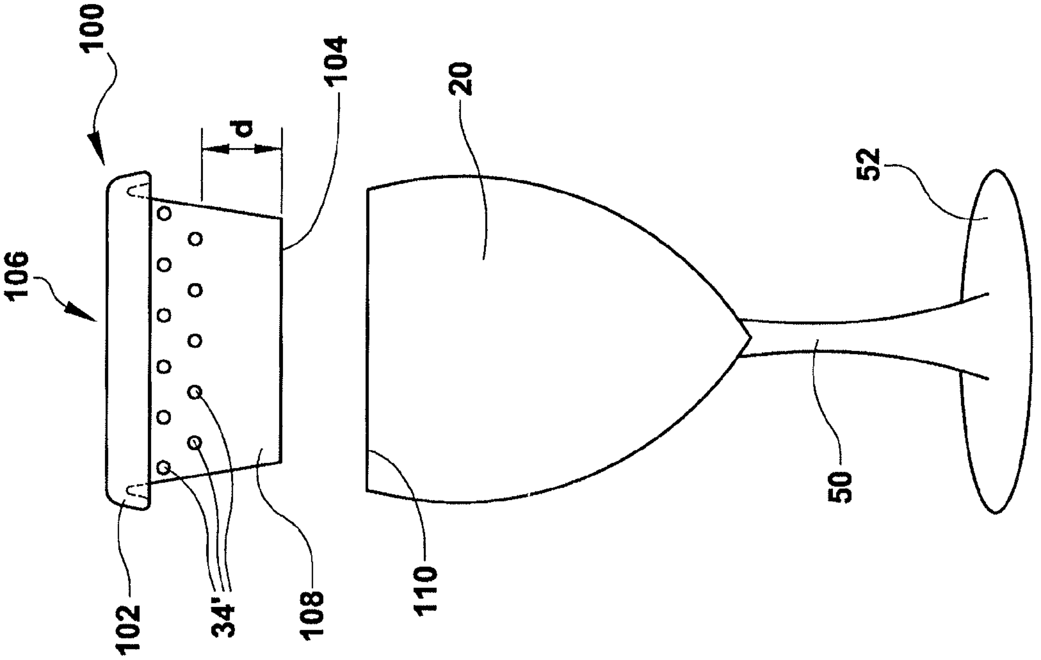
FIG. 9A is an exploded side elevational view of another embodiment of the beverage glass having a removable decanting cell according to the present invention.

In another embodiment of the beverage glass shown in the exploded and normal views of FIGS. 9A and (B, respectively, an aeration cell 100 or cup may be disposed on the rim 104 of a beverage glass 20 and supported by a lip 102 on the periphery of the upper opening 106 of the cell. The aeration cell 100 also includes a bottom wall 104 and a side wall 108 extending between the upper opening and the bottom wall. The side wall 108 includes perforations 34' spaced at least distance d from the bottom surface 104. The perforations are preferably spaced from the bottom surface a distance sufficient to allow particles and sediment in the wine to accumulate on the bottom surface without passing through the perforations 34' and into the bowl 20.

FIG. 9B shows aeration cell 100 in position on the bowl 20 of the beverage glass and a beverage 62 being poured therein. As the beverage level in the aeration cell reaches the perforations, the beverage begins to flow through the perforations and into the bowl 20. Lip 102 may be made to fit the rims of a variety of beverage glasses.

Further embodiments of the beverage glass of the present invention is shown in FIGS. 10-16, in which the numeral "1" has been added before corresponding features of the prior embodiments. In the embodiment shown in FIGS. 10-12, aeration cell 130 is supported by leg 136 above the bottom of bowl 120, and resembles a flower, with a plurality of petals 40 extending outwardly from an upwardly extending central protrusion 42. Each petal has an upwardly facing concave or hollow portion 40*a* on the petal interior surface between the base 40*b* and tip 40*c*. As shown in FIG. 12, wine 62 may be poured from a bottle through the bowl opening and contact protrusion 42 and/or hollow portions 42*a* and flow downward in stream 62' out through openings between the bases 40*b* of petals 42 and fall by gravity to the bottom of the bowl, to efficiently expose the surface area of the wine to the atmosphere. Projections or ridges 60 extending outwardly from the center may be formed on or above the bottom of bowl to add agitation to the wine stream 62' as it is swirled in the glass (FIG. 11). One or more of the hollow surfaces 40, protrusions 42 and projections 60 may be located at various positions within bowl 120.

Figure 13:
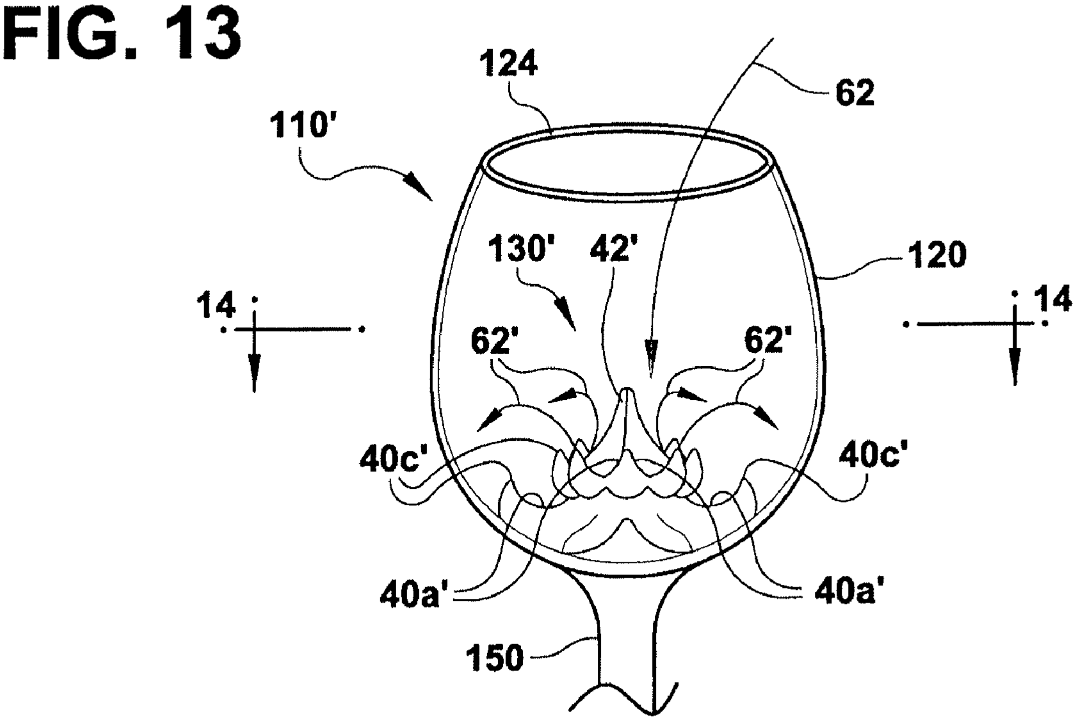
FIG. 13 is a perspective view of a sixth embodiment of the beverage glass according to the present invention.
Figure 14:
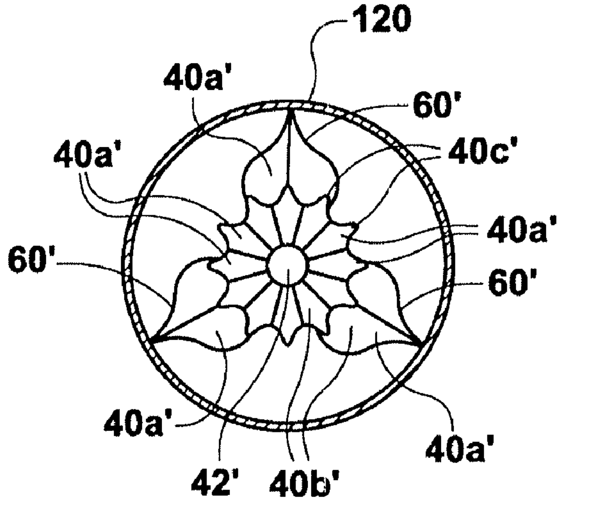
FIG. 14 is a sectional top plan view of the beverage glass of FIG. 13 shown along lines 14-14.

A modification of the beverage glass embodiment of FIGS. 10-12 is shown in FIGS. 13 and 14. Aeration cell 130' comprises upwardly concave or hollow surfaces 40*a*' between bases 40*b*' and tips 40*c*' located outwardly around central projection 62'. Hollow surfaces 40*a*' are formed on and extend above the bottom of bowl 120. Outwardly extending agitation ridges 60' resemble leaves with bases 40*b*' and tips 40*c*' that extend above the bottom of bowl, and additionally include upwardly facing hollow portions 40*a*' on their upper surfaces between the bases and tips. The multiple hollow portions 40*a*' surrounding projection 62' disposed in a lower position causes impinging wine 62 to splash in streams an upward direction 62' before falling to the bottom of the bowl.

Figure 15:
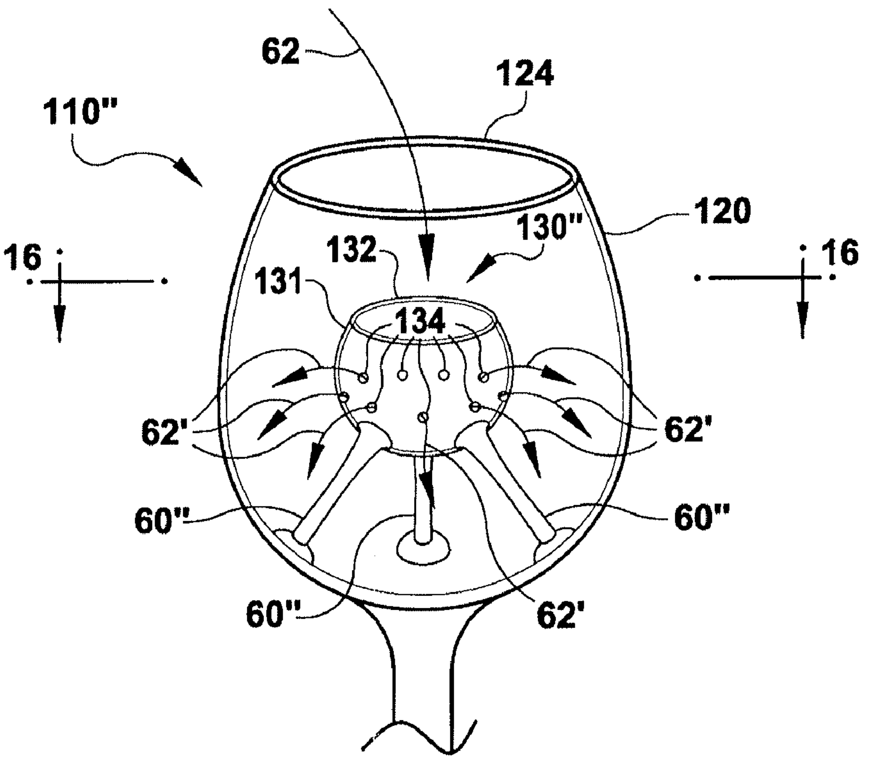
FIG. 15 is a perspective view of a seventh embodiment of the beverage glass according to the present invention.
Figure 16:
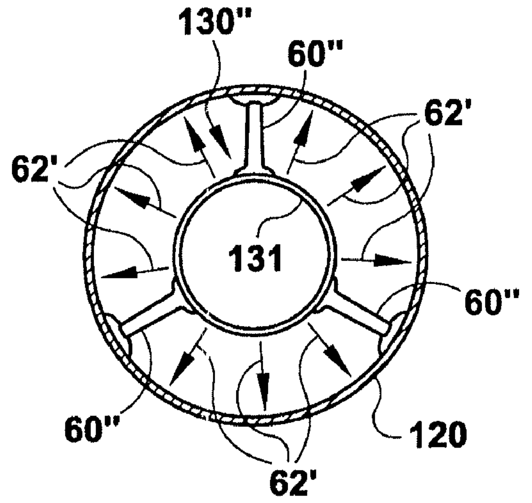
FIG. 16 is a sectional top plan view of the beverage glass of FIG. 15 shown along lines 16-16.

FIGS. 15 and 16 depict a modification of the embodiment of FIG. 1, wherein the aeration cell comprises a cup-shaped cell 130" having upper opening 132 and side wall 131 containing a plurality of openings 134. Wine 62 is poured into the upwardly concave or hollow surface within the aeration cell and forms streams 62' falling from the cell openings toward the bowl 120 bottom. Instead of a single leg, multiple supports 60", here shown in a tripod leg configuration extending outwardly from the bottom of cell 130", not only support the cell, but also form the projections or ridges that add agitation to the wine as it is swirled in the bottom of the bowl.

Figure 17:
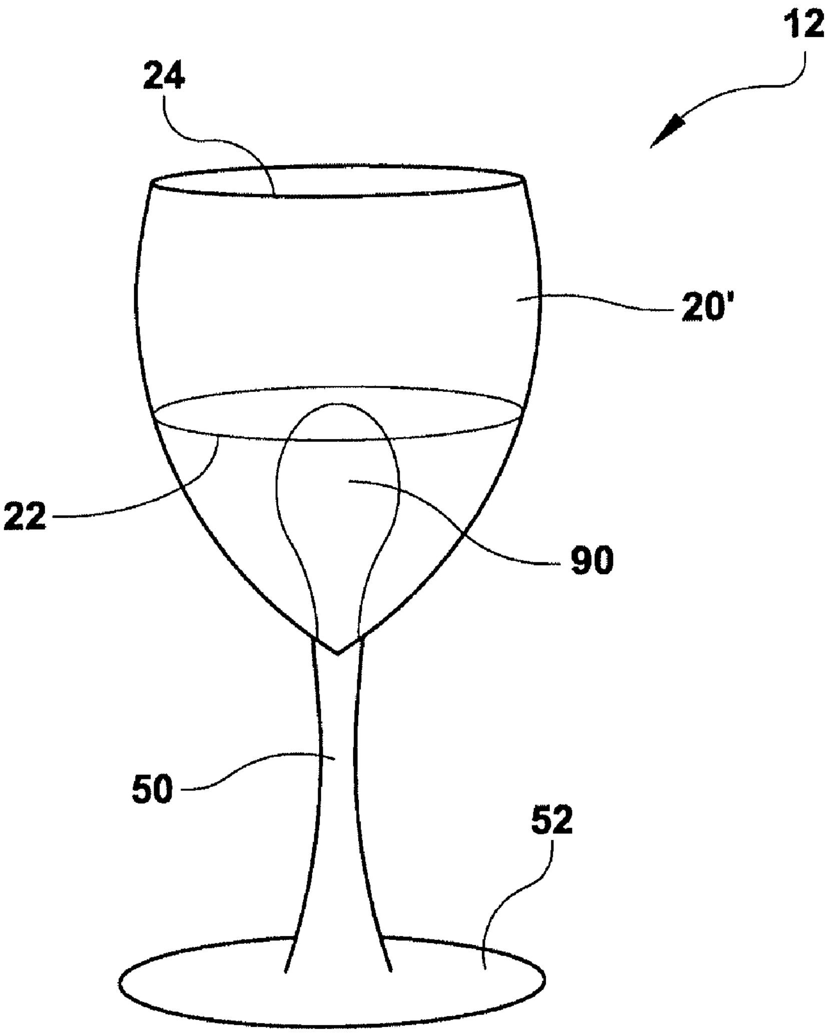
FIG. 17 is a perspective view of a beverage glass having an integrated internal cooling cell according to the present invention.

FIG. 17 shows a wine or beverage glass 12 for changing or maintaining a desired temperature of the beverage. The beverage glass includes a bowl 20', a sealed temperature cell or pod 90, a stem 50 and a foot 52. The temperature cell or pod 90 contains a solid, liquid or gel substance for cooling the beverage in the glass without diluting the beverage and is disposed inside the bowl 20'. Pod 90 is optionally removable from the inside of the glass bowl 20'. The cooling substance is sealed within the pod 90 so the beverage is not contaminated thereby. The cooling substance preferably a solid-to-liquid phase change between about 40 and 65° F. (4 and 18° 2C.) to maintain a desired wine at its most favorable temperature for drinking. Alternatively, the substance may also be used to heat the liquid in the bowl.

Figure 18:
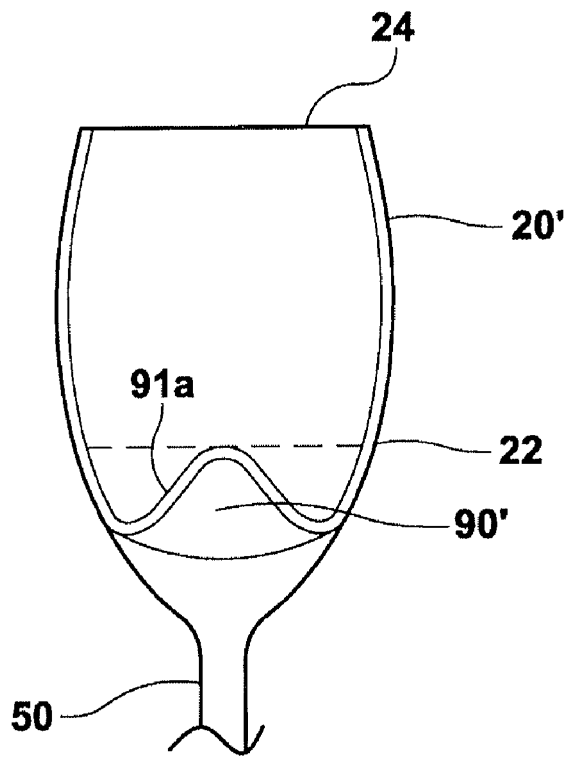
FIG. 18 is a side elevational view of one modification the beverage glass of FIG. 17.
Figure 19:
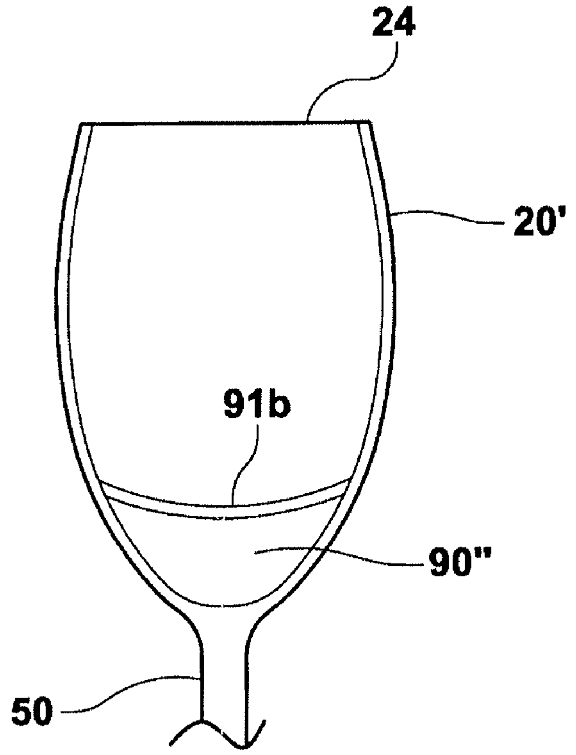
FIG. 19 is a side elevational view of another modification of the beverage glass of FIG. 17.

For best heat transfer, the bottom of the bowl has an upwardly convex surface 91*a* and the sealed cell 90' is below the convex surface, as shown in FIG. 18. Preferably, the highest point on the pod marks a specific volume of beverage, such as a standard portion or pour of wine, and is at the same level as volume indicating mark 22 on bowl 20' (FIGS. 17 and 18). Alternatively, as shown in FIG. 19, the bottom of the bowl has an upwardly concave surface 91*b* and the sealed cell 90" containing the cooling or heating substance is below the concave surface.

FIGS. 1-19 include embodiments of beverage glass of the present invention which work particularly well with wine, although they may be used with other beverages as well. The characteristics of red wine improve after the wine has been properly aerated and the features of the above embodiments provides for efficient aeration as well as decanting and filtration of particles which may be present in many bottles of wine.

Figure 20:
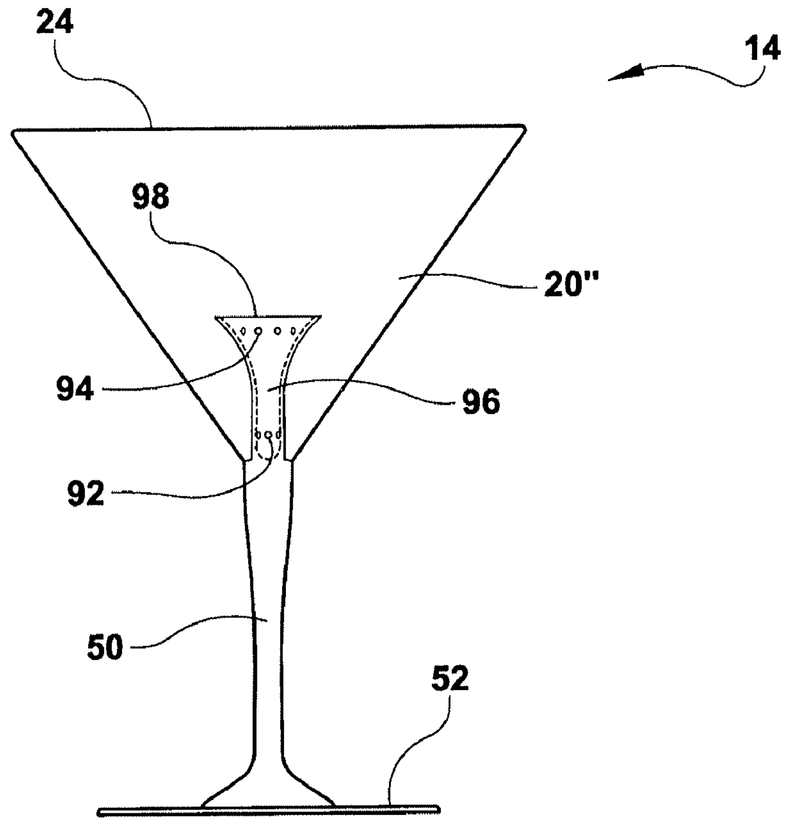
FIG. 20 is a beverage glass having an integrated internal cell for a flavoring liquid according to the present invention.
Figure 21:
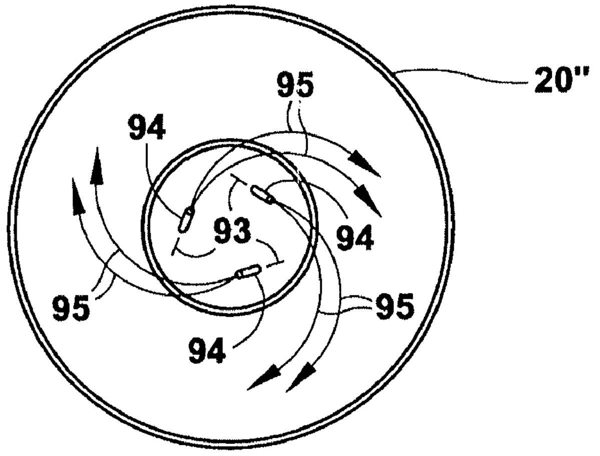
FIG. 21 is a top plan view of one modification the beverage glass of FIG. 20.

FIG. 20 shows a beverage glass for mixing a beverage with a liquid flavoring. The preferred beverage glass 14 comprises a conical bowl 20", a flavoring cell or pod 96, an elongated stem 50 and a base 52. The flavoring cell or pod 96 is preferably a fluted cell having a wider upper opening 98 and a plurality of upper perforations 94 and lower perforations 92 disposed on the side walls. The height of cell opening 98 may be at any level within the bowl 20", up to and including the height of bowl opening 24. Cell 96 is preferably non-removably attached to or integrated within the bowl of the beverage glass, but alternatively may be made to be removable therefrom. The perforations alternately may be disposed only on the upper portion of the cell, or only on the lower portion of the cell, rather than on both portions. Beverage glass 14 is particularly useful for martinis, where a flavoring liquid may be introduced into cell 96 and subsequently mixed with the vodka or gin in the bowl as it flows through the cell perforations. The perforations may be also formed through the thickness of the walls of the mixing cell so that the axes of the openings are non-radially oriented with respect to a center of the cell, as shown in FIG. 21, so that a flavoring liquid that is poured into the cell and subsequently flowed through the perforations swirls as it enters into the beverage in the bowl.

Although the drinking container is described herein as a glass, in the preferred embodiment it also encompasses cups, tumblers and other beverage containers having bowl openings larger than an individual user's mouth and intended for serving an individual portion of a beverage. The drinking container along with the internal cell may be made of a material other than glass, for example, acrylic or other plastic, and may be transparent, translucent or opaque.

Thus, the present invention provides an improved beverage glass having an internal cell for decanting, filtering, mixing and/or aerating a beverage upon pouring the beverage into the beverage glass. The invention also provides an improved beverage glass with an internal cell for changing the temperature of a beverage, or for holding and mixing a flavored liquid within a beverage.

While the present invention has been particularly described, in conjunction with specific preferred embodiments, it is evident that many alternatives, modifications and variations will be apparent to those skilled in the art in light of the foregoing description. It is therefore contemplated that the appended claims are not limited to the specific preferred embodiments disclosed herein and will embrace any such alternatives, modifications and variations as falling within the true scope and spirit of the present invention.

Thus, having described the invention, what is claimed is:

1. A method of using a wine-drinking container for decanting and/or aerating wine comprising:

providing a wine-drinking container having a bowl with a bottom and an upper opening and an aerating cell within the bowl having an upwardly facing hollow portion above the bottom of the bowl, the hollow portion having a plurality of openings therein, the cell having a free upper opening that is below and spaced inwardly from the bowl upper opening, the cell being supported on at least one leg extending above a bottom of the bowl;

providing wine;

while the bowl and cell are initially empty, pouring the wine downwardly from above the bowl upper opening directly into the aerating cell; and permitting the wine to flow through the openings in upwardly facing hollow portion and fall by gravity into the bottom of the bowl to decant and/or aerate the wine.

2. The method of claim 1 wherein the wine-drinking container is made of glass.

3. The method of claim 1 wherein the wine-drinking container is made of plastic.

4. The method of claim 1 wherein the cell is supported on a single leg.

5. The method of claim 1 wherein the cell is supported on a plurality of legs.

6. The method of claim 1 wherein the aerating cell has an upwardly extending central protrusion adjacent the upwardly facing hollow portion and further including pouring the wine onto the upwardly extending central protrusion and permitting it to flow into the adjacent upwardly facing hollow portion.

7. The method of claim 1 wherein the cell includes a plurality of upwardly facing hollow portions disposed around an upwardly extending central protrusion and above the bottom of the bowl and further including pouring the wine onto the plurality of upwardly facing hollow portions.

8. The method of claim 1 including projections extending outwardly from the aerating cell inside the bowl at the bottom and further including imparting agitation to the wine by swirling the wine around the bottom of the bowl over the outwardly extending projections.

9. The method of claim 1 wherein the hollow portion has a plurality of openings around the periphery of the cell, axes of the openings being non-radially oriented with respect to a center of the cell, and including flowing the wine through the openings into the bottom of the bowl to mix and swirl the wine.

10. The method of claim 1 wherein the cell upper opening has a width less than half that of the bowl upper opening.

11. The method of claim 1 wherein the cell upper opening has a width greater than half that of the bowl upper opening.

12. The method of claim 1 wherein the wine-drinking container has a bowl supported by a single stem and a base.

13. The method of claim 1 wherein the wine-drinking container is made of glass and has a bowl supported by a single stem and a base.

* * * * *